Aug. 17, 1937. E. E. W. KASSNER 2,089,966
PROCESS FOR ALTERING THE ENERGY CONTENT OF DIPOLAR SUBSTANCES
Filed Dec. 5, 1932 2 Sheets-Sheet 1
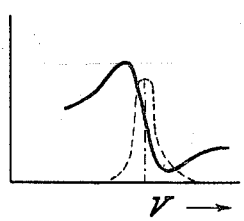
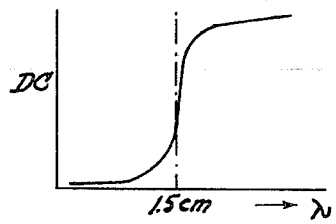
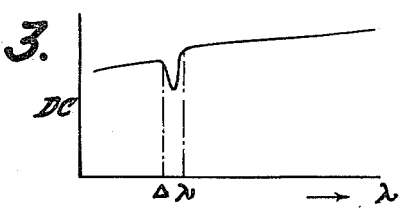
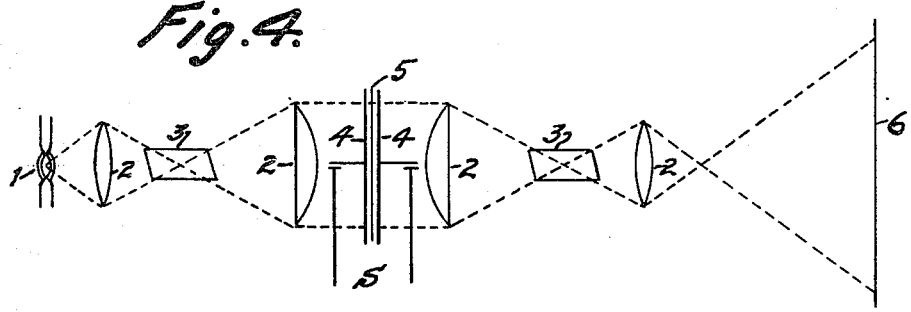
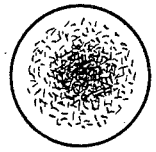 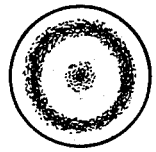  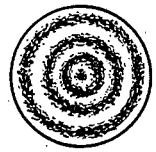
INVENTOR-
ERNST EDUARD WILHELM KASSNER.
BY
ATTORNEYS.

Aug. 17, 1937.  E. E. W. KASSNER  2,089,966
PROCESS FOR ALTERING THE ENERGY CONTENT OF DIPOLAR SUBSTANCES
Filed Dec. 5, 1932   2 Sheets-Sheet 2
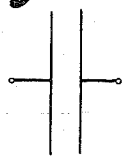 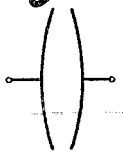 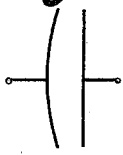 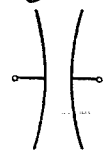
Fig. 6a.  Fig. 6b.  Fig. 6c.  Fig. 6d.
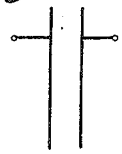 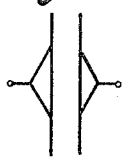 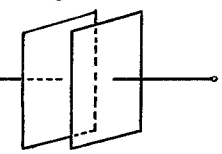
Fig. 6e.  Fig. 6f.  Fig. 7a.
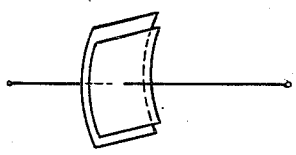 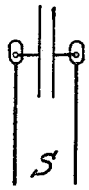 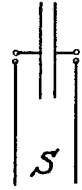
Fig. 7b.  Fig. 8a.  Fig. 8b.
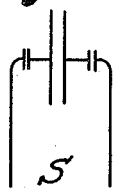 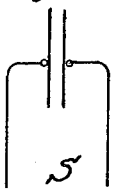 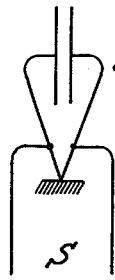
Fig. 8c.  Fig. 8d.  Fig. 8e.
INVENTOR-
ERNST EDUARD WILHELM KASSNER.
BY
ATTORNEYS.

Patented Aug. 17, 1937

2,089,966

UNITED STATES PATENT OFFICE 2,089,966

PROCESS FOR ALTERING THE ENERGY CONTENT OF DIPOLAR SUBSTANCES

Ernst Eduard Wilheim Kassner, Arbon, Switzerland

Application December 5, 1932, Serial No. 645,759
In Germany December 9, 1931

16 Claims. (Cl. 204—31)

This invention relates to a process for altering permanently as well as temporarily the energy content of dipolar substances by exposing them to rapidly oscillating electromagnetic fields.

By dipolar substances are meant, not only those that contain dipoles in the absence of an electric field, but also those in which dipoles are induced when the substance is exposed to a suitable electric field. "Dipole" is used in the sense familiar in connection with the well known work of Debye, as expounded (for example) in his book entitled, "Polar Molecules" published in 1929 in New York by the Chemical Catalogue Co.

It is known that the dielectric constant and certain associated properties of a dipolar substance are changed when it is placed in an electric field. But such changes hitherto produced by electric field have been transitory and have vanished with the field. This invention is not concerned with them except in so far as they are necessarily associated with permanent alterations; by a permanent alteration is meant one that endures for an appreciable period after the substance has ceased to be exposed to the electromagnetic field.

By an alteration in the energy content of a substance is meant one that does not consist solely in a change in the temperature of the substance or in a change inevitably consequent on change of temperature. On the other hand in the process known as diathermy the temperature of a substance which may be dipolar, is raised permanently (in the above sense) by exposure to a rapidly oscillating electromagnetic field. The object of the present invention, however, is not to produce a rise of temperature, although it may happen in certain instances that the characteristic period or frequency of a dipolar substance may be such that a rise of temperature of the medium in which it is immersed will inevitably occur in the course of the application of the process of the invention.

The process with which this invention is concerned depends on the fact that a dipolar substance is characterized by one or more definite periods and frequencies, which will be termed its characteristic periods and frequencies. The chief of these characteristic periods and frequencies, as explained more fully below, are, 1. The relaxation time of the orientation of the dipoles when exposed to a varying electric field;
2. The period of natural oscillation relative to each other of the charges constituting a dipole;
3. Differences of the terms (in the spectroscopic sense) characteristic of the atomic and molecular structure.

It has been found that permanent alteration of the energy content of a dipolar substance can be produced by exposing it to an electromagnetic field of sufficient intensity varying with a period or frequency substantially equal to one of these characteristic periods or frequencies.

The characteristic periods or frequencies most important for the invention lie in the region of the spectrum corresponding (in the conventional sense) to wave lengths between the infra-red and about 2 metres, but the use of periods or frequencies lying slightly outside these limits is not outside the invention. The region of the spectrum within which these periods or frequencies lie will be hereinafter termed quasi-optical. Special methods are necessary to obtain electromagnetic fields of sufficient intensity oscillating with these frequencies. They cannot be obtained by setting into oscillation combinations of discrete condensers and self-inductances; for the dimensions of the condenser or coil required are so small, and consequently the volume in which a strong field is established is so small, that no sufficient amount of the substance can be introduced into it. On the other hand two methods have been found of obtaining the necessary fields of the necessary volume.

In one method conductors bounding the space in which the substance is contained are set into natural oscillations in virtue of their distributed capacity and inductance, so that standing waves are set up within the space. Suitable conductors for the purpose are a pair of concentric tubes or a plate-resonator consisting of opposed plates excited into their modes of natural vibration. A field produced by this method will be termed hereafter a "standing field".

In another method radiation of the appropriate frequency is concentrated into the space containing the substance by means of reflectors. A field produced by this method will be termed hereafter a "radiating field".

The term "concentrated field" will mean a field produced by either of these methods.

According to the invention a process for altering permanently the energy content of dipolar substances comprises the step of exposing the substance to a concentrated electromagnetic field oscillating with a quasi-optical period or frequency such period or frequency being substantially equal to one of the characteristic periods or frequencies of the substance. It is to be understood that the oscillation of the field need not be sinusoidal, so that it has only a single period or frequency; it may be of any wave form so long as it contains as least one main component whose period or frequency is substantially equal to one of the said characteristic periods or frequencies.

The nature of the invention and the means for carrying it into effect will now be described in greater detail.

In the drawings,

Fig. 1 is a typical resonance curve of a dipolar substance;

Fig. 2 is a curve showing the dielectric constant of water as a function of the wave length;

Fig. 3 is a curve illustrating the resonance dispersion in an electrolyte as a function of wave length;

Fig. 4 is a diagrammatic view showing the optical arrangement for determining the field distribution of a plate oscillator;

Figs. 5a to 5d illustrate different field distributions of a plate oscillator;

Figs. 6a to 6f illustrate diagrammatically different forms of plate oscillators;

Figs. 7a and 7b are perspective views of two forms of plate oscillators; and

Figs. 8a to 8e show diagrammatically different coupling arrangements for plate oscillators.

As oscillators according to modern conceptions of the construction of materials may be mentioned the combined electrons, the combined atoms and the dipolar molecules. Since these particles are carriers of electric charges, they are set in oscillation under the influence of external electrical alternating fields, as for example the electromagnetic radiation field. They absorb energy from the applied alternating field. The excitation is especially strong and the absorption of energy therefore especially great in the case of resonance. Simultaneously with this there takes place a sudden change in all those properties which are connected with the energetic alternating action between oscillator and external oscillation, for example the above mentioned properties. A typical resonance curve is shown in Figure 1 of the accompanying drawings. The oscillation frequencies are given as abscissae and the ordinates are the corresponding strengths of the absorption of energy (dotted) and the values of any one of the dispersion properties, as for example the dielectric constant (full line). The region of the sudden change is termed the anomalous dispersion region, in contrast to the regions of normal dispersion on the branches of the curve lying further to the outside.

In many cases, for example when it is desired especially to emphasize the electrical nature of the alternating action between the electromagnetic field and the substance, the term polarization of the substance is also used, in order to express the polar structure of the oscillators.

In order to be able to state into which forms the absorbed energy is converted, it is necessary to bring the conception of polarization into a somewhat more precise form. It is preferably subdivided into:

1. An electron polarization, i. e. an influencing of the electron shells which build up and hold together the molecule;

2. An atomic polarization, i. e. a displacement of the position of the atoms which build up the molecule; and 3. An orientation polarization, i. e. a change in the relative positions of the molecules themselves.

The energies to be employed for the different polarizations are of quite different orders of size.

The greatest energy for polarization is required by the electrons, the least by the molecules. Now according to the quantum theory the following equation holds good:

$$\text{energy} = h.v$$

in which $h$ represents the Planck elementary quantum and $v$ represents the frequency of oscillations of the electromagnetic rays. Thus the greater the energy to be introduced into the particles of material, the greater must be the frequency of oscillation of the rays, and the shorter therefore must be their wave-length. Accordingly the resonance positions of electron polarization lie in the region of the Röntgen, ultra-violet and visible light rays, the resonance positions of atomic polarization lie in the region of the infra-red spectrum and the resonance positions of orientation polarization lie still further beyond in the region of the radio short and ultra-short waves. Those which have been best investigated are the absorption spectra in the region of visible light. It is known therefrom that the absorbed light causes no appreciable physical or chemical changes in the irradiated substance. It is to the greater part radiated again as such. A part is converted into heat, another part may serve, with a change in its wave-length, to excite atomic oscillations (Raman effect) and in comparatively rare cases the rays of light passing into the substance give rise to chemical changes (photochemical reaction). The rareness of photochemical reactions is especially prominent. The behaviour in the infra-red region and in the ultraviolet region is very similar.

Heretofore but little was known regarding the behaviour of substances to the action of waves having wave lengths of the range of fractions of a millimetre, i. e., the infra-red rays and upwards to about two metres. This range is usually characterized as the "range of quasi-optical waves". The anomalous dispersion bands, especially, have still scarcely been exactly investigated. On the other hand the field of waves having a greater wave length than two metres has already been explored. The dielectric polarization is only slightly noticeable therein. Energy is only absorbed slightly and, since it is moreover almost completely converted into heat, is generally disagreeable, so that dielectric losses are spoken of. Only in a few special cases can this polarization be usefully employed (diathermy, Kerr cells).

I have now found that diploar substances and substances containing the same behave in a thoroughly new and unforseen manner when they are subjected to the action of an electromagnetic radiation field which oscillates mainly or wholly in at least one of the frequencies which is the same as one of the natural frequencies of the said substances in the region of waves of from the infra-red to several metres in wavelength. The term "natural frequency" is intended to mean the range of frequency of the anomalous dispersion and resonance dispersions. Especially profound influences take place by the action of fields the frequency of which correspond to the natural frequencies of the substance which are of a wave length smaller than 2 metres down to the infrared. By this action, an alteration in the energy content of the diploar substance takes place which becomes strikingly noticeable in an increased reactivity and an orientation of the molecules. The orientation of the molecules renders the substances doubly-refractive. This double refraction is comparable to the double refraction of small rods or currents, and therefore also effects a rotation of the plane of a ray of polarized light passed therethrough.

Before entering into details of this phenomenon, some observations may be made on the determination of the natural frequencies. From the previously described connection between resonance frequency and anomalous dispersion position it results that the latter is a suitable indicator for the resonance frequency. It is only necessary to follow the frequency dependence of a constant of a substance suitable for the range of waves concerned up to the anomalous position. The dielectric constants are especially suitable for this purpose. I have found that there are two sharply separated kinds of anomalous dispersion which may be differentiated as friction dispersion and resonance dispersion. Friction dispersion appears in all non-conducting dielectrics. With water for example it is as shown in Figure 2, wherein the curve shows the course of the dielectric constant when using varying wave lengths for observation, and exhibiting a band of anomalous dispersion at a wave length of about 1.5 centimeters.

The course of such functions has already been theoretically explained by Debye and brought into mathematical form. In the description, the time lag appears as a substantial constituent of the conception, i. e. the time which the molecules require in order to come into equilibrium with an external electric field. The time lag is, inter alia, dependent on the internal friction constant and the temperature. In order to tune the frequency of the applied field and the natural frequency of the substance to be treated to each other, the external frequency may be altered while keeping the time lag constant until resonance is attained, or the time lag may be altered while keeping the external frequency constant. The latter may be conveniently attained by altering the internal friction, i. e. by alteration of the temperature and/or concentration, in case the dipolar substance is to be acted upon in the form of a solution thereof.

Resonance dispersion appears in all conducting dielectrics, i. e. in electrolytes. It is of special importance for the processes in living organisms. Its curve differs very clearly from that of the friction dispersion, as may be seen from Figure 3 of the accompanying drawings. The band of anomalous dispersion is very small and sharply pronounced, frequently scarcely wider than $$\Delta\lambda = \frac{2}{100}\lambda$$

It can consequently be very readily overlooked. This hitherto unknown dispersion anomaly is connected with the alternating action of the ions.

In order to determine the natural frequency of dipolar substances and to alter the energy content of these substances, thereby allowing the technical effects hereinafter described to be obtained, electromagnetic fields in part of relatively small field strength but also in part of great field strength are necessary. For the production of fields of the necessary wavelength there may be employed in the transmitter ordinary commercial short wave tubes which are operated with waves of wave lengths of more than about 80 centimetres in back coupling circuit and with waves of wave lengths of less than 80 centimetres in the brake field circuit according to Barkhausen, Kurz and Hollmann. The tuning of the transmitter to the dipole resonance is effected in known manner by alteration of the self-induction and/or capacity of the circuit and by alteration of the grid and/or anode potential of the tube. Waves having a wave length of down to 3 centimetres can be produced with sufficient power with the aid of electron tubes. In the case of still shorter waves, it is at present still necessary to resort to the oscillation energy of known spark transmitters. Also with suitable spark transmitters, small wave bands may be produced by appropriate technical high frequency arrangements.

In order to strengthen the action of the electromagnetic fields thus produced they may be directed and concentrated by known means. This is especially of importance in cases when it is desired to carry out the action only in certain zones. A direction of the field may be effected by reflectors and a concentration may be effected between Hertz parabolic mirrors. Extremely concentrated fields may be produced by a new process and a new apparatus which is hereinafter referred to as a plate-oscillator. Various types of plate oscillators are shown, for example, in Figs. 6a to 6f and in Figs. 7a and 7b.

The plate-oscillator resembles in its external form, but not in its electrical behaviour, a condenser. In a modification which is especially suitable in practice it consists of two oppositely arranged plates. By reason of the distributed self-induction and distributed capacity which every electric conductor has, the plate-oscillator also has an electric resonance. By reason of the smallness of the distributed self-induction and distributed capacity, this resonance lies at very high frequencies. For example with circular plates having a diameter of 10 centimetres and spaced 1 centimetre apart the natural frequency lies at a wavelength of about 30 centimetres. By employing larger plates the wavelength increases and vice versa. Similarly the wave-length increases when the plates are spaced at shorter distances apart. When in circuit the plate-oscillator behaves, when it is worked in the neighbourhood of or exactly in its natural frequency, similarly to an aerial with longer waves. This similarity only holds good when considering the oscillator as a circuit element, i. e. it has the said natural frequency by reason of distributed capacity and self-induction, and therefore it has radiation resistance and also loss resistance. While the aerial—or in the range of short waves, the Hertz dipole—radiates towards the exterior, in the plate-oscillator substantially the whole of the electromagnetic oscillation energy is concentrated on the space between the plates. This is fundamentally different from the aerial and is an unknown kind of energy concentration. The whole oscillation energy, which when employing dipole aerials is distributed in space, is concentrated in a volume which only amounts to a few cubic centimetres depending on the dimensions of the plate-oscillator. In the case of resonance there is formed on the plate-oscillator a quite definite voltage distribution, or a corresponding field distribution in the space between the plates. By employing large powers of oscillation, this field distribution (hereinafter referred to as the "configuration" of the field) may be reproduced optically with the aid of the orientation of the molecules caused in dipolar substances. For that purpose it is necessary that the plates are made transparent while maintaining good conductivity. By cathodic atomization of a metal, gold for example, plates may be prepared which have a light absorption of from about 10 to 15 per cent per plate. By introducing a thin layer of dipolar substance (i. e. a layer which alters the electrical properties of the plate-oscillator as little as possible or not at all) between the plates of the plate-oscillator which is transparent, and by observing this layer in polarized light the configuration may be rendered clearly visible. In the optical arrangement shown in Figure 4, 1 is a source of light, 2 an arrangement of lenses, 3 Nicol's prisms, 4 the plates of the plate-oscillator coupled to the transmitter S, 5 a layer of dipolar substance and 6 a screen. On the screen the zones where double refraction occurs in the dipolar substance corresponding to the configuration of the field are rendered light or dark depending on the position of the Nicol's. The whole configuration is projected onto the screen. If the plates be excited in their fundamental oscillation by tuning the frequency of the loosely coupled transmitter correspondingly, there appears on the screen a configuration as shown in Figure 5a. The greatest field strength prevails in the centre and the field strength diminishes continually towards the edge. This configuration, as hereinafter described in greater detail, is especially suitable for the construction of a practically inertia-less light relay. It is only necessary to screen off the edge parts by a circular mask and to modulate the transmitter in order to obtain a steering of the stream of light with the optical arrangement shown in Figure 4.

Similarly to an aerial, the plate-oscillator may be excited not only in its fundamental oscillation, but also in its upper oscillations. There is, however, a difference. It is customary to excite aerials in upper oscillations which are integral multiples of the fundamental oscillation. With the plate-oscillator, however, its characteristic upper oscillations are usually not integral multiples of the fundamental oscillation. The exact position of the upper frequencies depends on the electrical and mechanical configuration of the plate-oscillator.

The plate-oscillator need not consist of two oppositely arranged circular plates as shown in Figure 6a. When it is desired to obtain a field strength as homogeneous as possible in a large volume, the plate-oscillator may consist of convex plates or a convex and a plane plate (Figures 6b and 6c) or, when it is desired to obtain especially great field strength in the middle of the space between the plates, it may consist of concave plates (Figure 6d). The coupling of the plate-oscillator need not be in the centre or centre of gravity. The supply of voltage may also be effected eccentrically. (Figure 6e.) The coupling may also be effected at two or more points on the plates (for example as shown in Figure 6f). Furthermore, the edges of the plates may have a shape other than circular, as for example the shapes shown in Figures 7a and b. In short, the plate-oscillator may be widely varied by altering the distance between the plates, the shape of the plates and the points of coupling. In all these modifications there is a certain distributed capacity and a certain distributed self-induction the product of which determines in known manner the fundamental natural frequency. As already stated, the spectrum of the upper frequencies of a plate-oscillator depends in a large degree on its size, shape and manner of coupling. The plate-oscillator behaves analogously to an acoustic membrane during mechanical oscillatory excitation. For the simplest case of the circular plate-oscillator coupled exactly in the centre, Figure 5 shows some especially important upper oscillations with their configurations. In the experiments forming the basis of these diagrams, the distance between the plates amounted to $\frac{1}{5}$ of the diameter of the plates and the thickness of the layer of dipolar substance amounted to $\frac{1}{100}$ of the diameter of the plates. With a diameter of the plates of 10 centimetres, the fundamental frequency, in order to give a concrete example, corresponds to a wave length of 30 centimetres. The configuration having one circle (Figure 5b) is obtained by excitation with a transmission wave of 13 centimetres, the configuration having two circles (Figure 5c) by excitation with a wavelength of 8.33 centimetres and the configuration having three circles (Figure 5d) with a wave-length of 6.2 centimetres.

If the plates are provided with a transparent especially thin conducting layer so that the electric conduction is considerably diminished (this is the case when light absorptions of only from 1 to 5 per cent per plate occur) the loss resistance of the plate system is strongly increased. The resonance curve of the plate-oscillator is wide. A large half value breadth of the plate-oscillator, which is especially given when the oscillator is formed from oppositely arranged wire gauze, is in certain cases advantageous for a series of purposes for which the plate-oscillator may be employed.

If the plate-oscillator has but slight internal losses, i. e. if the layer of dipolar substance interposed is sufficiently thin, and if the conductivity of the plates is good, i. e. if it has sharply pronounced resonance properties, a very loose coupling between oscillator and transmitter is necessary in order to avoid back actions to the transmitter. With large half value breadths of the oscillator, the coupling may be more rigid. The loose coupling of the oscillator is effected in analogy to high frequency technique. Some examples of the practical carrying out of this coupling are given in Figures 7 and 8. The modifications 8a to 8d all amount to effecting the coupling of the oscillatory energy through a small partial capacity, which with plates of 10 centimetres in size, for example, may have values of from 1/10 to 2 centimetres capacity. Partial capacities of this order are obtained according to the modification shown in Figure 8a by providing for each plate a ball with a wire ring arranged around the same at a distance of a few millimetres, in Figure 8b by providing two balls, and in Figure 8c by providing two small plates. Figure 8d differs from these in so far as the partial capacity is formed directly between the plates of the oscillator and a counter electrode. This modification has the advantage that the points of coupling to the plates may be readily varied. For the range of frequency coming into question here, the capacity of the coupling is especially simple and suitable. It is not essential to employ capacitive coupling. A further modification of the coupling is shown in Figure 8e in which the transmitter S is coupled inductively and galvanically with the plate-oscillator through a short piece of wire. In this case the coupling takes place not at the voltage maximum but near the nodal point. An earth is shown diagrammatically in Figure 8e; this is not intended to represent an earth in the usual sense, (which can no longer be realized without objection in this range of frequency), but merely the connection of the corresponding circuit point with a metallic mass having a sufficiently great capacity towards earth. The plate-oscillator may also be coupled in the radiation field, if desired also in a concentrated radiation field.

In order to carry out the tuning to one of the natural frequencies of the dipolar substance, the natural frequency of the plate-oscillator must be capable of being tuned. In tuning it is preferable to distinguish between a coarse and a fine tuning. The coarse tuning is effected by altering the dimensions, especially the diameter, of the oscillator plates. In order to be able to tune to the dipolar substance, the natural frequency of which has a definite value at a given temperature and concentration, a corresponding size of the plate-oscillator must thus always be used. For example if the natural resonance of the dipolar substance lies at a wavelength of 30 centimetres, a diameter of 10 centimetres is necessary in the case of circular plates, always assuming, that the fundamental oscillation of the oscillator is to be used, which yields a specially concentrated field. When the coarse tuning has been effected by dimensioning, a fine tuning is still necessary to produce the resonance. In practice the fine tuning is most simply effected by altering the distance between the plates. The smaller this distance, the greater the natural frequency. The plate-oscillator is suitable for the production of concentrated electromagnetic radiation fields having a wavelength of about 5 millimetres to 10 metres.

In order to bring into action the electromagnetic fields corresponding to one or more natural frequencies of the dipolar substance, the dipolar substance is brought, according to the desired intensity of the action, into the electromagnetic field of corresponding frequency which may be undirected, or directed (e. g. by reflectors) or concentrated (e. g. by Hertz mirrors), or, if an especially intense action is necessary, the dipolar substance is exposed to the stationary field in thin layers between the electrodes of the plate-oscillator.

In cases when a substance has several natural frequencies in the range concerned, such as is the case mainly in electrolyte mixtures, a tuning may also be effected with the aid of means known in high frequency technique. Thus work has already been done on curved characteristics and also by coupling further transmitters tuned to the upper waves.

The energy supplied by resonance excitation varies either the inter-molecular or intra-molecular equilibrium of the substance depending on the radiated natural frequency or on the intensity thereof. In the case of colloids for example the influencing of the intermolecular fields of force results in a change in the size of particles (conversion from the sol into the gel conditions or vice versa, flocculation, change in the viscosity or conductivity and the like) or in a change in the degree of hydration (influencing of the ageing phenomena of colloids, as for example silica gel, albumens, pectins and similar colloids).

In order to illustrate the effects taking place in colloidal solutions by irradiation with electromagnetic fields having a frequency which corresponds with a natural frequency of the irradiated solution, an experiment carried out with a colloidal solution of gold is given below. The solution showed a maximum resonance with a wavelength of 18.6 centimetres and at about 20° centigrade. The solution was interposed in a layer 1 millimetre in thickness between the circular plates of plate-oscillator the said plates being 1 centimetre apart. In this arrangement the natural oscillation of the plate-oscillator with a plate diameter of about 6.2 centimetres (configuration Figure 5a) was at a wavelength of 18.6 centimetres. In the transmitter a French short wave special tube "Métal Type E.4.M" was used. After acting on the solution for an hour, the original red colour of the solution changed to orange, a change in colour which as is well known indicates a diminution in the size of the colloid particles. By intensive irradiation for longer periods an opposite effect is observed, a flocculation taking place.

For further illustration an experiment carried out with agar-agar solution the resonance position of which lay at a wavelength of 116 centimetres may be referred to. These longer waves require plates of considerably greater diameter for the purpose of tuning the plate-oscillator. With the plates 1 centimetre apart, plates having a diameter of nearly 39 centimetres are necessary, as determined by calculation and confirmed by experiment in order that the fundamental wave of the oscillator has a wavelength of 116 centimetres. In order to avoid these somewhat troublesome dimensions, the experiment was carried out in a plate-oscillator in which the distance between the plates was reduced from 1 centimetre to about 0.5 centimetre, whereby it was possible to employ circular plates having a diameter of 20 centimetres. The fine tuning of the oscillator system to the dipolar layer (having a thickness of 1 millimetre and a natural frequency of 116 centimetres) interposed between the plates was effected by regulating the distance between the plates. The oscillatory energy in this experiment was produced with a tube "Métal Type T. M. C." After a short time the solution became more mobile, and after irradiation for several hours the opposite effect occurred and the solution became more viscous.

The effects in the case of colloids of living organisms are especially striking, where they are equivalent to a preservation. For example by suitable dosing of the intensity of radiation, the natural decomposition processes, which always commence with a decrease in the energy content and a change in the colloidal state, may be suspended. For example if fruit of all kinds be irradiated with the natural frequency of their expressed juices (on an average 40 centimetres with slight deviations) or animal products with the natural frequency of their serums (on an average from 85 to 95 centimetres), a preservation for weeks at ordinary temperature is obtained, whereas the same products without irradiation are spoilt within a few days under otherwise identical conditions. It is remarkable that the natural aroma is completely retained in the case of radiation-preservation. If the intensity of radiation exceeds the degree necessary for preservation, profound chemical changes take place.

By the action of electromagnetic fields of frequencies which correspond to one or more of the natural frequencies of the blood serum, profound effects may be produced in men and animals.

Serums are thoroughly complex liquids in which is present a large number of dipolar substances in more or less great dilution. The solvent is water. The position and strength of the anomalous dispersion bands vary according to the nature and concentration of the dipolar substances. Experiments have shown that differences in the position of the resonance positions occur not only in different serums but also in serums taken from different individuals. In fact even with one and the same individual, the strength and number of the absorption bands differ according to the prevailing condition of assimilation. Since the absorption bands, especially in the case of dipolar substances which are only present in small concentration, are in part extremely sharp (half value widths of less than 5 per cent) they readily escape observation when normal pure electrical methods are employed. The resonance positions herein described for example were found by using the lightening of a beam of light in crossed Nicol's (see the above described optical arrangement Figure 4) in order to recognize a resonance position.

In the said manner the serum of a test person was investigated. At a temperature of 37° centigrade an especially strongly pronounced resonance position was established at a wavelength of about 90 centimetres. Between this wavelength and the shortest dipolar resonance bands occurring in the serum, that of chemically pure water which lies at a wavelength of about 1.28 centimetres, there are a large number of characteristic resonance positions the accurate knowledge of which might give a comprehensive conception of the state of health of the person concerned. Resonance positions above a wavelength of about 1 metre are according to observations made up to the present rather wide. The supply of oscillatory energy from these long ranges of waves leads chiefly to increases in temperature, but not to the quite specific influences which are characteristic for most of the resonance positions below a wavelength of 1 metre. By irradiation with frequencies corresponding to the sharply pronounced resonance positions, it is possible, as experiments have proved, to cause quite definite reproduceable effects. The alterations of energy in the body lead to advantageous effects or also to marked injury.

If it is intended specifically to act on foreign bodies in the serum, as for example bacteria, there are two possibilities; either the irradiation is effected in the frequency which corresponds to a strongly pronounced absorption position owing to the presence of foreign bodies in the serum and thus the nutrient medium and therefore, for example, the living conditions of the bacteria are altered, or the irradiation is effected in frequencies which correspond to the natural frequencies of the dipolar substance from which the bacteria are built up.

Purely chemical reactions can also be enforced which otherwise only proceed under the influence of heat or of catalysts. For example isoprene is converted into a rubberlike polymerization product, rubber is vulcanized in the presence of sulphur, bakelite A and B are converted into bakelite C, varnishes and lacquers dry more quickly, acetylene combines with water to form acetaldehyde which in the presence of oxidizing agents, as for example ozone, is immediately converted into acetic acid, and so forth.

A further effect to be observed by the action of resonant electromagnetic fields is that the dipolar molecules are orientated. Such orientation of dipolar molecules which in general are in the disordered thermal equilibrium, could hitherto only be produced by the action of an external electrostatic field which due to the smallness of the dimensions of the molecules must be very strong, in order to exert an appreciable torque on the molecules and thereby orientate the molecules. For the orientation of dipolar molecules by means of electrostatic fields voltages are necessary which nearly reach the disruptive strength of the dielectrics and thus are of the order of about between 100,000 and 200,000 volts. Consequently an orientation of conductive dielectrics by means of electrostatic fields is not possible since in such dielectrics the field breaks down.

In contradistinction thereto, conductive as well as non-conductive dipolar substances can easily be orientated by means of resonant electromagnetic fields. At the first glance this appears to be improbable since it is to be assumed that the molecules will change periodically their direction in phase with the field or rotate in the same phase and not arrange in a preferred position. This assumption would be correct, if the molecules would not exert directed forces on each other. Such directed forces, however, are existing as results from the fact that without any external influence the single molecules orientate themselves to some extent on their neighbouring molecules while passing through the sphere of influence of the latter, as can be observed in X-ray spectrograms. The same forces are also the cause of the formation of associates of molecules as can be observed in many cases, for example of pairs of molecules, as in the case of acetic acid, shoals of molecules as with azoxyanisol, or the accumulation of dipolar molecules around an ion as is the case with hydrated ions. Such associates are liable to form groups by interlocking.

The formation of such associates essentially depends on the frequency of collisions of two molecules, the greatness of the intermolecular forces and the probability of the collision of two molecules in a position favorable for the formation of associates. By setting the molecules into uniform oscillation by means of a resonant electromagnetic field the probability of the molecules colliding with each other in a position favorable for the formation of associates and the formation of such associates and groups of interlocked associates is essentially increased. Such associates and groups are not any more capable of following the phase of the applied field, but can only exert tilting oscillations about a position determined by the applied field. This, however, is equal to an orientation of the molecules throughout the whole mass. An electrostatic field acting simultaneously with the electromagnetic field and in parallel therewith has no great influence on the orientation process for the reason set forth above. It may, however, help to increase the percentage of orientated molecules and to keep a body of molecules which have once been orientated, in the ordered condition, even when the electromagnetic field is withdrawn, since it is not any more necessary to orientate a body of disordered molecules requiring a high voltage, but prevent a body of orientated molecules substantially supporting itself to fall back into the disordered condition. For this purpose an electrostatic field is sufficient, the voltage of which is from 10 to 20 times smaller than is necessary to produce such orientation by means of an electrostatic field alone.

After withdrawing the applied resonant electromagnetic field by which the orientation is produced, the disordered thermal equilibrium is produced again. The orientation may be maintained however, if the dipolar substance, while being orientated, be converted into the solid state the orientation being thus "frozen in", so to speak. This may be attained by solidifying an orientated gelatinizable dipolar substance or a gelatinizable liquid in which an orientated dipolar substance is dissolved, or by cooling an orientated dipolar substance below its melting point, or by evaporating the solvent in which an orientated solid dipolar substance has been dissolved. Such "freezing in" of an orientated substance in the said manner can only be effected while maintaining the resonant electromagnetic field alone, if the solidification takes place without change of temperature or concentration, that is to say if during the solidification the alternating field and molecules do not come out of phase by change of the time lag. This is the case if the solidification be effected by gelatinization at constant temperature. When producing solidification by cooling or evaporating of a solvent the orientation must be maintained by means of an electrostatic field since during the solidifying process the time lag of the molecules is changed. In the latter case the electromagnetic field by which the orientation is produced may be withdrawn. The maintenance of an orientation proceeds especially well when particularly long-chained molecules (great time lag) are embedded in an amorphously solidifying melt. Mixtures of paraffin and beeswax or glycerine with beeswax or colophony or ethoxy-benzene-amino-methyl-cinnamic acid were investigated in this way. The value of the mean surface density of the permanent orientation charge amounted for example to 0.5 to $2.0 \times 10^{-9}$ coulombs per square centimetre positive.

A substance having a "frozen-in" orientation of its molecules is richer in energy than the same substance in natural thermal equilibrium. When "thawed" it gives up this excess of energy, and, indeed, in the form of radiations of the same wavelength as those with which it was originally orientated. This behaviour may be used in order to supply to animal bodies dosed amounts of energy of a natural frequency which is active in the organism, as for example by allowing an aqueous gelatine the natural frequency of which is the same as the natural frequency of the serum to solidify, while orientated, and then to incorporate it into the body in this form.

Important technical effects result when the resonant electromagnetic fields brought into action are modulated by high or low frequency. As examples the effects of modulation in the case of the excitation of a plate-oscillator the cover of which is transparent and conducting are described in the following. If the plate system be prepared so transparent by cathodic atomization while maintaining a good conductivity that only about 20 per cent of light is absorbed or reflected, then by means of polarized light the configuration of the stationary wave field is portrayed by the orientation effect produced in the dipolar substance which causes a double refraction. If the plate-oscillator be modulated by impressing a lower frequency tone oscillation, by over-storage or by resonance detuning, the wave train formed is imprinted in all its detail on the dielectric and rendered visible in two dimensions by the described arrangement. The described apparatus may be used especially for steering large streams of light.

What I claim is:

1. A process of permanently altering the energy content of dipolar substances which comprises acting on a dipolar substance with a concentrated electromagnetic field mainly oscillating in at least one frequency which is the same as one of the natural frequencies of the said substance in the region between the infra-red and about 2 meters in wave length.

2. A process of permanently altering the energy content of dipolar substances which comprises acting on a dipolar substance with a concentrated electromagnetic field mainly oscillating in frequencies which are the same as several of the natural frequencies of the said substance in the region between the infra-red and about 2 meters in wave length.

3. A process of permanently altering the energy content of dipolar substances which comprises acting on a dipolar substance with a standing electromagnetic field mainly oscillating in at least one frequency which is the same as one of the natural frequencies of the said substance in the region between the infra-red and about 2 meters in wave length.

4. A process of permanently altering the energy content of dipolar substances which comprises acting on a dipolar substance with a standing electromagnetic field mainly oscillating in frequencies which are the same as several of the natural frequencies of the said substance in the region between the infra-red and about 2 meters in wave length.

5. A process of permanently altering the energy content of dipolar substances which comprises acting on a dipolar substance with a concentrated electromagnetic field mainly oscillating in at least one frequency which is the same as one of the natural frequencies of the said substance in the region between the infra-red and about 2 meters in wave length, the exact tuning of the frequency of the said field to the said natural frequency of the dipolar substance being effected by adjusting the time lag of the said substance to the frequency of the said field.

6. A process of permanently altering the energy content of dipolar substances which comprises acting on a dipolar substance with a concentrated electromagnetic field mainly oscillating in at least one frequency which is the same as one of the natural frequencies of the said substance in the region between the infra-red and about 2 meters in wave length, together with an electrostatic field.

7. A process of permanently altering the energy content of dipolar substances which comprises acting on a dipolar substance while in a fluid condition with a concentrated electromagnetic field mainly oscillating in at least one frequency which is the same as one of the natural frequencies of the said substance in the region between the infra-red and about 2 meters in wave length, whereby molecules of the said substance are orientated, and solidifying the said substance during such orientation.

8. A process of permanently altering the energy content of dipolar substances which comprises acting on a dipolar substance while in a fluid condition with a concentrated electromagnetic field mainly oscillating in at least one frequency which is the same as one of the natural frequencies of the said substance in the region between the infra-red and about 2 meters in wave length, whereby molecules of the said substance are orientated, and solidifying the said substance while maintaining the orientation by means of an applied electrostatic field.

9. A process of permanently altering the energy content of a dipolar substance which comprises acting on a gelatinizable dipolar substance with a concentrated electromagnetic field mainly oscillating in at least one frequency which is the same as one of the natural frequencies of the said substance in the region between the infra-red and about 2 meters in wave length, whereby molecules of the said substance are orientated, and gelatinizing the said substance during such orientation.

10. A process of preserving dipolar substances of natural origin by altering the energy content of said substances which comprises acting on a dipolar substance of natural origin with a concentrated electromagnetic field mainly oscillating in at least one frequency which is the same as one of the natural frequencies of the biological liquid of said substance in the region between the infra-red and about 2 meters in wave length.

11. A process of influencing the biological processes of living organisms by altering the energy content of dipolar substances contained in the said organisms which comprises acting on a living organism with a concentrated electromagnetic field mainly oscillating in at least one of the frequencies of the biological liquid of the said organism in the region between the infra-red and about 2 meters in wave length.

12. The process for determining the natural frequencies of a dipolar substance, which comprises acting on said substance with a concentrated electromagnetic field oscillating at a predetermined frequency in the region between the infra-red and about 2 meters in wave length while passing polarized light through the substance and through an analyzing means to form a pattern on an objective and adjusting the relationship between the time lag of said substance and the frequency of said field until a pattern characteristic of the natural frequency is produced.

13. The process for determining the natural frequencies of a dipolar substance, which comprises acting on said substance with a concentrated electromagnetic field oscillating at a predetermined frequency in the region between the infra-red and about 2 meters in wave length while passing polarized light through the substance and through an analyzing means to form a pattern on an objective while adjusting the frequency of said field until a pattern characteristic of the natural frequency is produced.

14. The process for determining the natural frequencies of a dipolar substance, which comprises acting on said substance with a concentrated electromagnetic field oscillating at a predetermined frequency in the region between the infra-red and about 2 meters in wave length while passing polarized light through the substance and through an analyzing means to form a pattern on an objective and adjusting the natural frequency of said substance by varying the temperature, pressure or concentration of the substance until a pattern characteristic of the natural frequency is produced.

15. The process of permanently altering the energy content of dipolar substances, which comprises producing an electromagnetic field oscillating at a frequency between the infra-red and about 2 meters in wave length and substantially equal to one of the characteristic periods or frequencies of the substance by exciting a resonator having distributed inductance and capacity and allowing said resonator to oscillate at its natural period, exposing the substance to the electromagnetic field thus produced and adjusting the relationship between said characteristic period or frequency of the substance in the above range and the frequency of the oscillating field so as to cause said periods or frequencies to coincide whereby said substance is treated at said characteristic period or frequency.

16. The process of permanently altering the energy content of dipolar substances, which comprises producing a concentrated electromagnetic field oscillating with a period or frequency between the infra-red and about 2 meters in wave length substantially equal to one of the characteristic periods or frequencies of the substance by inducing free oscillations in an oscillator having distributed inductance and capacity and having a natural period corresponding to said characteristic period or frequency and exposing the substance to the field thus produced.

ERNST EDUARD WILHELM KASSNER.